United States Patent [19]
Akitomo et al.

[11] Patent Number: 5,153,244
[45] Date of Patent: Oct. 6, 1992

[54] CURABLE ORGANOSILOXANE COMPOSITION YIELDING ELASTOMERS EXHIBITING REDUCED COMPRESSION SET VALUES

[75] Inventors: Hiroshi Akitomo; Akito Nakamura, both of Tokyo, Japan

[73] Assignee: Dow Corning Toray Silicone Company, Ltd., Tokyo, Japan

[21] Appl. No.: 600,564

[22] Filed: Oct. 19, 1990

[30] Foreign Application Priority Data

Oct. 31, 1989 [JP] Japan ................................. 1-284313

[51] Int. Cl.⁵ .............................................. C08K 5/34
[52] U.S. Cl. ...................................... 524/88; 524/720
[58] Field of Search .................................. 524/88, 720

[56] References Cited

U.S. PATENT DOCUMENTS

| | | | |
|---|---|---|---|
| 2,723,964 | 11/1955 | Warrick | 260/37 |
| 3,364,161 | 1/1968 | Nadler | 260/18 |
| 3,645,968 | 2/1972 | Phillips et al. | 260/45.75 |
| 4,301,056 | 11/1981 | Patzke et al. | 260/37 |
| 4,868,063 | 9/1989 | Okmura et al. | 524/862 |

FOREIGN PATENT DOCUMENTS

| | | |
|---|---|---|
| 0332785 | 9/1989 | European Pat. Off. |
| 54/53164 | 4/1979 | Japan |
| 1/279981 | 11/1989 | Japan |
| 0893399 | 4/1962 | United Kingdom |
| 1470465 | 4/1977 | United Kingdom |

OTHER PUBLICATIONS

"Fabricating wire and cable with liquid silicone": by Fraleigh and Kehrer, *Rubber World,* pp. 33-35, 1980, 181(5).

*Primary Examiner*—Melvyn I. Marquis
*Attorney, Agent, or Firm*—Robert Spector

[57] ABSTRACT

The compression set values of elastomers prepared from organosiloxane compositions that cure by a platinum-catalyzed hydrosilylation reaction are substantially reduced by the presence in said compositions of a phthalocyanine compound or a metal derivative of such a compound, where the metal is copper, nickel, cobalt or iron.

3 Claims, No Drawings

CURABLE ORGANOSILOXANE COMPOSITION YIELDING ELASTOMERS EXHIBITING REDUCED COMPRESSION SET VALUES

BACKGROUND OF THE INVENTION

1. Field of the Invention

The present invention relates to organosiloxane compositions that cure by a hydrosilylation reaction. More particularly, this invention relates to organosiloxane compositions which can be cured by a hydrosilation reaction to yield elastomers exhibiting low compression set values.

This invention also relates to a method for reducing the compression set values of elastomers prepared from a specified class of curable organosiloxane compositions by incorporating a phthalocyanine compound or a metal derivative of said compound into said compositions.

2. Description of the Prior Art

Organosiloxane compositions which cure by a hydrosilylation reaction, i.e. the addition of silicon-bonded hydrogen atoms across silicon-bonded alkenyl radicals, are well known. Elastomers prepared by curing these compositions in the presence of a platinum-containing catalyst are used in components for office automation equipment, automobiles, and other devices because these compositions are easy to process and they cure more rapidly at lower temperatures than organosiloxane compositions that cure by free radical-initiated reactions.

A shortcoming of elastomers prepared from compositions that cure by a platinum-catalyzed hydrosilylation reaction is their relatively high compression set values when measured according standard test methods such as ASTM test method D 395 or Japanese Industry Standard (JIS) test method K 6301. The compression set values are sufficiently high to render the elastomers unsuitable for applications such as gaskets and seals.

Fraleigh et al. [Rubber World (1980) 181(5) 33] report the need for post-curing at 200° C. to reduce the compression set of elastomers prepared from commercially available liquid organosiloxane compositions that cure by a platinum-catalyzed hydrosilylation reaction.

The need to post-cure the cured elastomers by heating them for extended periods of time increases processing costs and considerably reduces the productivity rate for the final elastomer.

Accordingly, there is a need for curable organosiloxane compositions having the rapid cure rate characteristic of hydrosilylation reactions and which yield elastomers exhibiting compression set values below about 20 percent without a lengthy post-cure.

It is known to improve the physical properties, particularly compression set, of elastomers prepared from organosiloxane compositions cured by a platinum-catalyzed hydrosilylation reaction by including in the compositions various additives, including polyorganosiloxanes containing alkenyl hydrocarbon radicals such as vinyl bonded to non-terminal silicon atoms.

The addition of small amounts (less than 0.1 weight percent) of a mixture of an alkali metal salt of hydrogen-containing phosphoric and a hydrogen-containing phosphorus acid to improve the flame retardancy and compression set of silicone rubber prepared from compositions cured using various types of curing agents and/or catalysts is taught in European Patent Application No. 332,785, published on Sep. 20, 1989.

The preparation of cured silicone rubber exhibiting low values of compression set, high tear strength and self-extinguishing properties from curable compositions comprising a polyorganosiloxane exhibiting a degree of polymerization greater that 1000 and containing from 0.01 to 2 mole percent of silicon-bonded vinyl radicals, organohydrogensiloxanes containing at least 2 silicon-bonded hydrogen atoms per molecule, a zero-valent platinum-phosphorus complex as the curing catalyst, a reinforcing silica and sulfur-free carbon black is taught in Japanese patent publication No. 54/53164, which issued on Apr. 26, 1979.

The addition of reaction products of ferric chloride and triphenylamine to peroxide curable organosiloxane compositions to lower the compression set of the cured elastomer is taught in U.S. Pat. No. 3,645,968, which issued to Phillips et al. on Feb. 29, 1972.

U.S. Pat. No. 4,301,056, which issued to Patzke et al. on Nov. 17, 1981 teaches adding calcium hydroxide to peroxide-curable organosiloxane compositions to lower the compression set values and increase the resistance to property degradation in the presence of heated oil of the resultant cured silicone rubber.

Phthalocyanine compounds and metal derivatives of these compounds have been used as pigments in silicone resins and in organosiloxane compositions that are subsequently cured to form elastomers either by the use of organic peroxides and heating or by the reaction of hydroxyl-terminated polydiorganosiloxanes with alkyl silicates or organohydrogensiloxanes. References disclosing this use of phthalocyanine compounds include U.S. Pat. No. 3,364,161 British patent no. 1,470,465; and Japanese patent publication nos. 1/279,981 and 62/223,788.

U.S. Pat. No. 2,723,964 teaches using polynuclear benzenoid compounds such as copper phthalocyanine and ingoid dyes to improve the thermal stability of silicone elastomers cured using organic peroxides.

The use of indanthrene blue, terphenyl, phthalocyanines or metal phthalocyanines to impart a resistance to degradation in the presence of heat and ionizing radiation to specified types of silicone elastomers is taught in British patent no. 893,399. The elastomers are cured using an organic peroxide, sulfur or alkyl silicates in the presence of metal salts of carboxylic acids or amines as catalysts.

SUMMARY OF THE INVENTION

The present inventors have now discovered that the compression set values of cured elastomers prepared from curable organosiloxane compositions by a platinum-catalyzed hydrosilation reaction can be improved without the need for post curing by incorporating a phthalocyanine compound or a metal derivative of a phthalocyanine compound into the curable composition.

DETAILED DESCRIPTION OF THE INVENTION

The present invention relates to a curable organopolysiloxane rubber composition comprising
(A) 100 parts by weight of an organopolysiloxane having at least 2 silicon-bonded alkenyl radicals in each molecule,
(B) an organohydrogenpolysiloxane having at least 2 silicon-bonded hydrogen atoms in each molecule, the concentration of said organohydrogenpolysiloxane being sufficient to provide a molar ratio of silicon-bonded hydrogen atoms to alkenyl radicals in said composition of from 0.5 to 20, and (C) as the hydrosilylation catalyst, platinum metal or a platinum compound, the concentration of said catalyst being equivalent to from 0.1 to 500 parts by weight of platinum per million parts of the combined weight of ingredients (A) and (B). The improvement comprises the presence in said composition of (D) from 0.01 to 5 parts by weight of a phthalocyanine compound or a metal derivative of said compound to reduce the compression set value of cured elastomers prepared from said composition, where said metal is selected from the group consisting of copper, nickel, cobalt, iron, chromium, zinc, platinum, paladium and vanadium.

The Phthalocyanine Compound (Ingredient D)

The inventive feature considered responsible for the low compression set values of elastomers prepared using the curable compositions of this invention, which values are typically less than 20 percent using preferred compositions, is the presence in the curable composition of a phthalocyanine compound or a metal derivative of a phthalocyanine compound.

Suitable phthalocyanine compounds can be represented by formula (1).

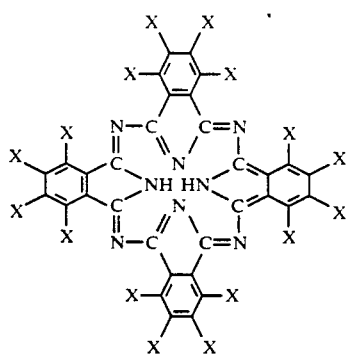

The substituent represented by X in the preceding formula can be a hydrogen or halogen atom. Suitable halogen atoms are chlorine, bromine, and iodine.

Phthalocyanine compounds that include a coordinated metal atom are preferred, based on their greater ability to lower the compression set value of cured elastomers relative to compounds in which the metal is absent. The metal phthalocyanine compounds can be represented by the following formula (2)

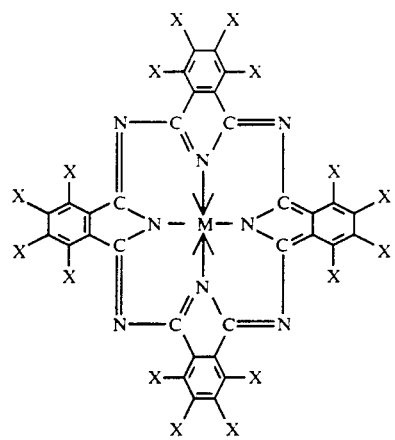

In formula (2) X has the same definition as in formula (1) and M is a metal atom selected from copper, nickel, cobalt, iron, chromium, zinc, platinum, pladinum and vanadium.

The phthalocyanine compounds can be synthesized from phthalic anhydride, urea, and, optionally, a salt of any of the metals represented by M in formula 2. Methods for preparing ingredient (D) are well known in the art.

Ingredient (D) is present at a concentration of from 0.01 to 5 weight parts per 100 weight parts ingredient (A). The compression set value of the cured organopolysiloxane rubber is not substantially reduced at concentrations below 0.01 parts by weight. Concentrations greater than about 5 weight parts can interfere with the curing reaction, resulting in a reduction in cure rate and/or the physical properties of the cured material.

The Alkenyl-Containing Organopolysiloxane (Ingredient A)

The organopolysiloxane comprising ingredient (A) is the principal ingredient of the present compositions. This ingredient must contain at least two silicon-bonded alkenyl radicals in each molecule. Suitable alkenyl radicals contain from 1 to about 10 carbon atoms and are exemplified by but not limited to vinyl, allyl and propenyl. The silicon-bonded organic groups other than alkenyl radicals present in ingredient (A) are typically monovalent hydrocarbon and halogenated hydrocarbon radicals exemplified by but not limited to alkyl radicals such as methyl, ethyl and propyl; aryl radicals such as phenyl and tolyl; and halogenated alkyl radicals such as 3,3,3-trifluoropropyl and 3-chloropropyl.

The molecular structure of ingredient (A) can be straight chain, branch-containing straight chain, cyclic, or network. The molecular weight of this ingredient is not specifically restricted, and can range from low-viscosity fluids to high-viscosity gums. To obtain a rubbery, elastic material upon curing, ingredient (A) should preferably exhibit a viscosity of at least 100 centipoise (0.1 Pa.s) at 25 degrees Centigrade.

The Organohydrogenpolysiloxane (Ingredient B)

The organohydrogenpolysiloxane functions as a crosslinker in the curable organopolysiloxane rubber compositions of the present invention. In the presence of the hydrosilylation catalyst [ingredient (C)], the silicon-bonded hydrogen atoms in ingredient (B) undergo hydrosilylation, i.e. an addition reaction across the silicon-bonded alkenyl groups in ingredient (A), which leads to crosslinking and curing of the composition.

Ingredient (B) must contain at least 2 silicon-bonded hydrogen atoms in each molecule. The silicon-bonded organic groups present in the ingredient are selected from the same group of monovalent hydrocarbon and halogenated hydrocarbon radicals as the organic groups of ingredient (A), with the proviso that these organic groups cannot be alkenyl radicals. The molecular structure of ingredient (B) can be straight chain, branch-containing straight chain, cyclic, or network.

While the molecular weight of ingredient (B) is not specifically restricted, viscosities in the range of 3 to 10,000 centipoise at 25 degrees Centigrade are preferred.

The concentration of ingredient (B) is sufficient to provide a molar ratio of silicon-bonded hydrogen atoms to alkenyl radicals in the curable composition of from 0.5 to 20. A range of from 1 to 3 is preferred.

When the curable composition contains less than 0.5 moles of silicon-bonded hydrogen atoms per mole of alkenyl radicals the composition cannot be satisfactorily cured. Bubble formation can occur above the upper limit of 20.

The Hydrosilylation Reaction Catalyst (Ingredient C)

Curing of the present compositions is catalyzed by platinum an platinum compounds.

Examples of typical curing catalysts include but are not limited to chloroplatinic acid, alcohol solutions of chloroplatinic acid, the olefin complexes of chloroplatinic acid, platinum black, and platinum metal on various solid supports.

The concentration of ingredient (C) in the present compositions is equivalent to a platinum concentration of from 0.1 to 500 parts by weight of platinum metal, preferably from 1 to 50 parts by weight of platinum metal, per million parts (ppm), based on the combined weight of ingredients (A) and (B).

Curing does not proceed satisfactorily at below 0.1 ppm, while exceeding 500 ppm is uneconomical.

Optional Additives

The curable organosiloxane composition of this invention can contain one or more of various additives. The effect of these additives can range from reducing the viscosity of the curable composition to improving the mechanical strength of moldings prepared from the composition. Typical additives include but are not limited to reinforcing fillers such as precipitated silica, fumed silica, calcined silica, and fumed titanium oxide; non-reinforcing fillers such as quartz powder, diatomite, asbestos, aluminosilicic acid, iron oxide, zinc oxide, and calcium carbonate. The surfaces of any of these fillers can be treated with an organosilicon compound such as organosilanes and low molecular weight organopolysiloxanes. The compositions can also contain any of the organosiloxane resins known to be effective reinforcing agents for organosiloxane elastomers.

So long as the objectives of the present invention are not compromised, the curable organopolysiloxane composition of the present invention may contain small or very small quantities of one or more additives for inhibiting the curing reaction, such as acetylenic compounds, hydrazines, triazoles, phosphines, or mercaptans.

One or more of the following additives can be present to impart desirable properties to the cured elastomer: pigments, heat stabilizers, flame retardants, internal release agents, plasticizers, and non-reactive silicone oils.

Preparation of Curable Compositions

The curable compositions of the present invention can be easily and simply prepared by blending ingredients (A) through (D) together with any optional additives to homogeneity using any of the known mixing/kneading means, which include but are not limited to two roll mills, blade type mixers and kneader mixers.

When heated the present curable organopolysiloxane composition cure to yield elastomers exhibiting low values of compression set. This value is typically less than 20 percent for elastomers prepared from preferred compositions. Many of the end use applications for cured elastomers, such as gaskets and seals, require this property.

EXAMPLES

The following examples describe the preparation and curing of preferred compositions of this invention, together with the properties of the cured elastomers. The examples should not be interpreted as limiting the scope of the invention as defined in the accompanying claims. Unless otherwise specified all parts in the examples are by weight, and viscosities were measured at 25° C.

The physical properties of the cured elastomers were measured using the test methods described in Japanese Industrial Standard (JIS) K 6301. An English translation of this collection of test procedures is commercially available. The compression set test was conducted by compressing cylindrical samples measuring 12.7 mm. in thickness and 29.0 mm. in diameter to a thickness of 9.52 mm. between two rigid metal plates using spacers. The samples were then placed in an oven maintained at a temperature of 180° C. After 22 hours the samples were removed from the oven and the compressing device and allowed to remain under ambient conditions for 30 minutes on a wooden surface. The thickness of the samples was then measured and the percent compression set (CS) calculated using the following formula:

$$CS = [(t_0 - t_1)/(t_0 - t_2)] \times 100$$

where $t_0$ is the initial thickness of the test sample, $t_1$ is the thickness of the sample measured 30 minutes following completion of the compression and heating period, and $t_2$ is the thickness to which the sample is compressed during the test.

EXAMPLE 1

100 Parts of a methylvinylphenylsiloxy-terminated dimethylpolysiloxane exhibiting a viscosity of 2,000 centipoise (2 Pa.s) and 0.23 weight % of vinyl radicals (ingredient A), 20 parts of fume silica having a specific surface are of 200 m$^2$/gram whose surface had been treated with dimethyldichlorosilane, and 15 parts quartz powder were mixed to homogeneity to give a base compound.

The following ingredients were blended to homogeneity into the base compound: 2 parts of a trimethylsiloxy-terminated dimethylsiloxane-methylhydrogensiloxane copolymer containing 0.7 weight % of silicon-bonded hydrogen atoms (ingredient B), an amount of chloroplatinic acid equivalent to 20 ppm of platinum metal based on the combined weights of ingredients A and B, and 0.5 parts of copper phthalocyanine, available as Lionol Blue SL from Toyo Ink Mfg. Co., Ltd..

The resultant curable composition of this invention exhibited a viscosity of 2,000 poise (200 Pa.s) at a shear rate of 10 sec$^{-1}$. This composition was cured for 1 minute at 170 degrees Centigrade using a transfer press to produce samples for the compression set test and a sheet from which samples were cut for the other physical property measurements described in JIS K 6301 and listed in the accompanying tables.

For comparison, a curable organopolysiloxane composition was prepared and cured as described in the preceding section of this example, with the exception that the copper phthalocyanine was omitted. The properties measured for the sample prepared using the composition of this invention and the control sample are recorded in Table 1.

TABLE 1

| Property Measured | Present Invention | Comparison Example |
| --- | --- | --- |
| Hardness JIS A Scale | 40 | 40 |
| Tensile Strength (kf/cm2) | 52 | 51 |
| Tensile Elongation (%) | 430 | 410 |
| Compression set (%) | 18 | 35 |

EXAMPLE 2

The following ingredients were blended to homogeneity: 95 parts of a dimethylvinylsiloxy-terminated dimethylpolysiloxane with a viscosity of 10,000 centipoise (10 Pa.s) and containing 0.13 weight percent of vinyl radicals (ingredient A); 5 parts of an organopolysiloxane resin exhibiting a viscosity of 230 centipoise (0.23 Pa.s) and containing 5.6 weight percent of vinyl radicals (ingredient A'); 45 weight parts fumed silica with a specific surface area of 200 m2/g; 10 weight parts hexamethyldisilazane (surface treatment agent for the silica); and 3 weight parts water.

The resin contained the repeating units Me$_2$(CH$_2$=CH)SiO$_{\frac{1}{2}}$, Me$_3$SiO$_{\frac{1}{2}}$, and SiO$_{4/2}$ in a 7:5:2 molar ratio.

When a homogeneous blend of the ingredients was achieved it was heated for an additional 2 hours at 170° C. under reduced pressure. The following ingredients were then added to the resultant base and blended to homogeneity: 2.8 weight parts of an organohydrogenpolysiloxane containing 1 weight percent of silicon-bonded hydrogen atoms and exhibiting a viscosity of 20 centipoise (0.02 Pa.s) as ingredient B, an amount of a chloroplatinic acid/sym-tetramethyldivinyldisiloxane complex equivalent to 10 ppm of platinum metal based on the combined weight of ingredients A, A' and B, and 0.3 weight parts chlorinated copper phthalocyanine (Cyanine Green 6YK from Toyo Ink Mfg. Co., Ltd.).

Ingredient B consisted essentially of Me$_2$HSiO$_{\frac{1}{2}}$ units and SiO$_{4/2}$ units in a 9:5 molar ratio.

The resultant curable organosiloxane composition of this invention exhibited a viscosity of 9,000 poise (900 Pa.s) at a shear rate of 10 sec$^{-1}$.

Samples for the compression set test and other physical property measurements were prepared as described in Example 1. For comparative purposes, a curable organosiloxane composition was prepared using the same types and amounts of ingredients as described in the preceding section of this example, but omitting the chlorinated copper phthalocyanine. Cured test samples were then prepared and evaluated. The results of the evaluation of the two samples described in this example are recorded in Table 2.

TABLE 2

| Property Measured | Present Invention | Comparison Example |
| --- | --- | --- |
| Hardness (JIS A Scale) | 50 | 51 |
| Tensile Strength (kgf/cm2) | 98 | 95 |
| Tensile Elongation (%) | 600 | 580 |
| Compression Set (%) | 19 | 62 |

The data in Tables 1 and 2 demonstrate the ability of copper phthalocyanine and chlorinated copper phthalocyanine to reduce the compression set values of elastomers prepared from curable organosiloxane compositions of this invention without the need for post curing and without adversely affecting other desirable properties of the cured elastomer such as hardness and tensile strength.

That which is claimed is:

1. A method for reducing the compression set of cured elastomers prepared from curable organosiloxane compositions comprising
   (A) 100 parts by weight of an organopolysiloxane having at least 2 silicon-bonded alkenyl radicals in each molecule,
   (B) an organohydrogenpolysiloxane having at least 2 silicon-bonded hydrogen atoms in each molecule, the concentration of said organohydrogenpolysiloxane being sufficient to provide a molar ratio of silicon-bonded hydrogen atoms to alkenyl radicals in said composition of from 0.5 to 20, and
   (C) as the hydrosilylation catalyst, platinum metal or a platinum compound, the concentration of said catalyst being equivalent to from 0.1 to 500 parts by weight of platinum per million parts of the combined weight of ingredients (A) and (B), said method comprising the steps of
   1) incorporating into said composition from 0.01 to 5 parts by weight per 100 parts of said polyorganosiloxane of an additive selected from the group consisting of metal-free and metal-containing phthalocyanine compounds, and
   2) curing said composition to form an elastomer exhibiting a compression set value of less than 20 percent.

2. A method according to claim 1 where
said elastomer exhibits a compression set value less than 20 percent,
said metal is copper,
the organic groups of said organopolysiloxane are selected from the group consisting of monovalent hydrocarbon and halogenated hydrocarbon radicals,
said organopolysiloxane exhibits a viscosity of at least 100 centipoise at 25° C.,
the organic groups of said organohydrogenpolysiloxane are selected from the group consisting of monovalent hydrocarbon and halogenated hydrocarbon radicals and the viscosity of said organohydrogenpolysiloxane is from 3 to 10,000 centipoise at 25° C.,
the concentration of said organohydrogenpolysiloxane is provides a molar ratio of silicon-bonded hydrogen atoms to alkenyl radicals in said composition of from 1 to 3, said hydrosilylation catalyst is selected from the group consisting of chloroplatinic acid, alcohol solutions of chloroplatinic acid, olefin complexes of chloroplatinic acid, platinum black, and platinum metal on a solid support, and the concentration of said catalyst is equivalent to from 1 to 500 ppm of platinum, based on the combined weight of said organopolysiloxane and said organohydrogenpolysiloxane.

3. A method according to claim 2 where the organic groups other than alkenyl present in said organopolysiloxane and said organohydrogenpolysiloxane are selected from at least one member of the group consisting of methyl, phenyl, tolyl, 3,3,3-trifluoropropyl and 3-chloropropyl and said composition contains a reinforcing silica filler or a reinforcing organosiloxane resin.

* * * * *